(12) United States Patent
Sussman

(10) Patent No.: US 9,980,343 B1
(45) Date of Patent: May 22, 2018

(54) TUNABLE WHITE LIGHT BOX

(71) Applicant: Peter Sussman, St. Louis Park, MN (US)

(72) Inventor: Peter Sussman, St. Louis Park, MN (US)

( * ) Notice: Subject to any disclaimer, the term of this patent is extended or adjusted under 35 U.S.C. 154(b) by 390 days.

(21) Appl. No.: 13/969,574

(22) Filed: Aug. 18, 2013

Related U.S. Application Data

(60) Provisional application No. 61/691,253, filed on Aug. 20, 2012.

(51) Int. Cl.
*H05B 37/02* (2006.01)
*H05B 39/04* (2006.01)
*H05B 41/36* (2006.01)

(52) U.S. Cl.
CPC .................................. *H05B 37/02* (2013.01)

(58) Field of Classification Search
CPC .. H05B 41/325; H05B 41/3922; H05B 41/32; H05B 39/042; G03B 15/05
USPC .......................................... 315/151; 362/243
See application file for complete search history.

(56) References Cited

U.S. PATENT DOCUMENTS

| 7,148,470 | B2 * | 12/2006 | Rains et al. ................... | 250/228 |
| 2004/0052076 | A1 * | 3/2004 | Mueller .............. | F21V 23/0442 362/293 |
| 2007/0240346 | A1 * | 10/2007 | Li ........................... | G09F 13/20 40/544 |
| 2009/0153450 | A1 * | 6/2009 | Roberts et al. ................. | 345/84 |
| 2009/0278789 | A1 * | 11/2009 | Declercq et al. ............. | 345/102 |
| 2010/0148675 | A1 * | 6/2010 | Meijer et al. ................. | 315/152 |
| 2011/0149548 | A1 * | 6/2011 | Yang ........................ | F21V 5/04 362/84 |
| 2012/0032600 | A1 * | 2/2012 | Edwards et al. .............. | 315/151 |
| 2012/0235575 | A1 * | 9/2012 | Roberts et al. ............... | 315/151 |
| 2013/0307419 | A1 * | 11/2013 | Simonian ........... | H05B 33/0869 315/153 |

\* cited by examiner

*Primary Examiner* — Quan Tra
(74) *Attorney, Agent, or Firm* — Leanne Taveggia Farrell; Westman, Champlin & Koehler, P.A.

(57) ABSTRACT

A tunable white light box includes light sources and a controller for individually controlling each of the light sources. The light sources each generate a light having a peak wavelength that differs from the peak wavelength generated by another one of the light sources. The controller individually adjusts each of the light sources to generate a color temperature for a translucent media containing an image.

16 Claims, 10 Drawing Sheets

TUNABLE WHITE LIGHT BOX

CROSS-REFERENCE TO RELATED APPLICATIONS

This Application claims benefit of U.S. Provision Patent Application Ser. No. 61/691,253, filed Aug. 20, 2012, entitled "Tunable White Lightbox," which application is incorporated by reference herein in its entirely.

BACKGROUND

Retailers pay billions of dollars each year to advertise their products. To achieve effective results from advertising in a retail environment, visual messaging is critical and message consistency is vital. In many cases, the messaging becomes diluted when advertisements viewed by potential consumers on television, on the Internet, and in print media look dramatically different from the way the products appear to those potential customers in advertisements showcased in a retail store. In particular, a small color change in an advertisement can cause a drastic change in the overall mood of a potential customer viewing the advertisement.

SUMMARY

In various embodiments, a tunable white light box includes light sources and a controller for individually controlling each of the light sources. The light sources each generate a light having a peak wavelength that differs from the peak wavelength generated by another one of the light sources. The controller individually adjusts each of the light sources to generate a color temperature for a translucent media containing an image.

In some instances, different translucent media having a same image but produced with different manufacturing techniques may have different color temperatures when affixed to the tunable white light box for a given mixture of light intensities of the light sources in the tunable white light box. An advantage of the tunable white light box is that the controller may adjust the light intensities of the light sources, for example based on user input, so that the tunable white light box generates the same color temperature through different media.

In some embodiments, the tunable white light box includes a media sensor for measuring the color temperature of the translucent media when the translucent media is affixed to the tunable white light box. In these embodiments, the controller adjusts the light intensities of the light sources based on the measured color temperature to generate a predetermined color temperature of the translucent media. For example, the controller may adjust the light intensities of the light sources based on the measured color temperature and a user input indicating the predetermined color temperature so that the translucent media has the predetermined color temperature. In this way, the tunable white light box may be used to generate the predetermined color temperature of the translucent media quickly and easily.

In some embodiments, the tunable white light box includes an ambient light sensor for measuring the color temperature of ambient light. In these embodiments, the controller adjusts the light intensities of the light sources based on the measured color temperature of the ambient light to generate a same color temperature in different translucent media attached to the tunable white light box. For example, the controller may compute light intensity values for the light sources based on the measured color temperature of the ambient light and individually adjust the light intensities of the light sources based on the light intensity values.

In some embodiments, the tunable white light box includes a media light sensor for measuring a color temperature of a translucent media attached to the tunable white light box and an ambient light sensor for measuring the color temperature of ambient light. In these embodiments, the controller adjusts the light intensities of the light sources based on both the measured color temperature of the translucent media and the measured color temperature of the ambient light. For example, the controller may individually adjust the light intensities of the light sources so that the measured color temperature of the translucent media is the same as the measured color temperature of the ambient light.

A tunable white light box, in accordance with one embodiment, includes a light box and a controller. The light box includes light-emitting diode light sources for illuminating a translucent media comprising an image. Each of the light-emitting diode light sources is configured to generate a corresponding light having a peak wavelength. Moreover, the peak wavelength of the light generated by one of the light-emitting diode light sources is different from the peak wavelength of the light generated by another one of the light-emitting diode light sources. In various embodiments, the controller is operable to individually adjust each of the light-emitting diode light sources for adjusting a color temperature of the translucent media. In various embodiments, the controller is operable to individually adjust each of the light-emitting diode light sources for generating a same color temperature for different translucent media having different light diffusion characteristics. In some embodiments, the system includes a light sensor for measuring a color temperature of ambient light. In these embodiments, the controller is configured to individually adjust a light intensity of the light generated by each of the light-emitting diode light sources for generating a color temperature of a translucent media that is substantially the same as the measured color temperature.

A tunable white light box, in accordance with one embodiment, illuminates a translucent media comprising an image. The tunable white light box includes light emitting diode sources, an ambient light sensor, and a controller. Each of the light emitting diode sources is configured to generate a corresponding light having a peak wavelength. Moreover, the peak wavelength of the light generated by a first light-emitting diode light source is different from the peak wavelength of the light generate by a second light-emitting diode light. The ambient light sensor measures a light intensity of ambient light. The controller is configured to individually adjust a light intensity of the light generated by each light-emitting diode light source for generating a color temperature of the translucent media. The controller is further configured to adjust the light intensity of the light generated by the light-emitting diode light sources based on the measured light intensity A method of illuminating a translucent image, in accordance with one embodiment, includes generating light from corresponding light-emitting diode light sources in a light box for illuminating a translucent media comprising an image. Each light generated by a light-emitting diode light source has a peak wavelength. Moreover, the peak wavelength of the light generated by one of the light-emitting diode light sources is different from the peak wavelength of the light generated by another one of the light-emitting diode light source. The method further includes measuring a color temperature of ambient light. Additionally, the method includes individually adjusting a light intensity of the light generated by each of the light-emitting diode light sources for generating a color temperature of the translucent media that is substantially the same as the measured color temperature.

A method of illuminating a translucent image, in accordance with one embodiment, includes generating a plurality of light from a corresponding plurality of light-emitting diode light sources for illuminating a translucent media comprising an image. Each light of the plurality of light has a peak wavelength. Moreover, the peak wavelength of the light generated by a first light-emitting diode light source of the plurality of light-emitting diode light sources is different from the peak wavelength of the light generate by a second light-emitting diode light source of the plurality of light-emitting diode light sources. The method further includes measuring a light intensity of ambient light. Additionally, the method includes individually adjusting a light intensity of the light generated from each light-emitting diode light source of the plurality of light-emitting diode light sources for generating a color temperature of the translucent media. Further, the method includes adjusting the light intensity of the plurality of light-emitting diode light sources based on the measured ambient light for adjusting a light intensity of the translucent media while maintaining the color temperature of the translucent media.

DETAILED DESCRIPTION

In various embodiments, a tunable white light box individually controls light sources having different peak wavelengths. Additionally, the tunable white light box individually adjusts each of the light sources to generate a color temperature of a translucent media attached to the tunable white light box. In some embodiments, the tunable white light box measures the color temperature of the translucent media and individually adjusts each of the light sources based on the measured color temperature to generate the color temperature of the translucent media containing the image.

In various embodiments, the tunable white light box can color balance printed images in different mediums or color balance printed images that are printed with different printers, or both. In some embodiments, the tunable white light box can adjust the color of a printed image to compensate for an ambient light source.

Figure 1:
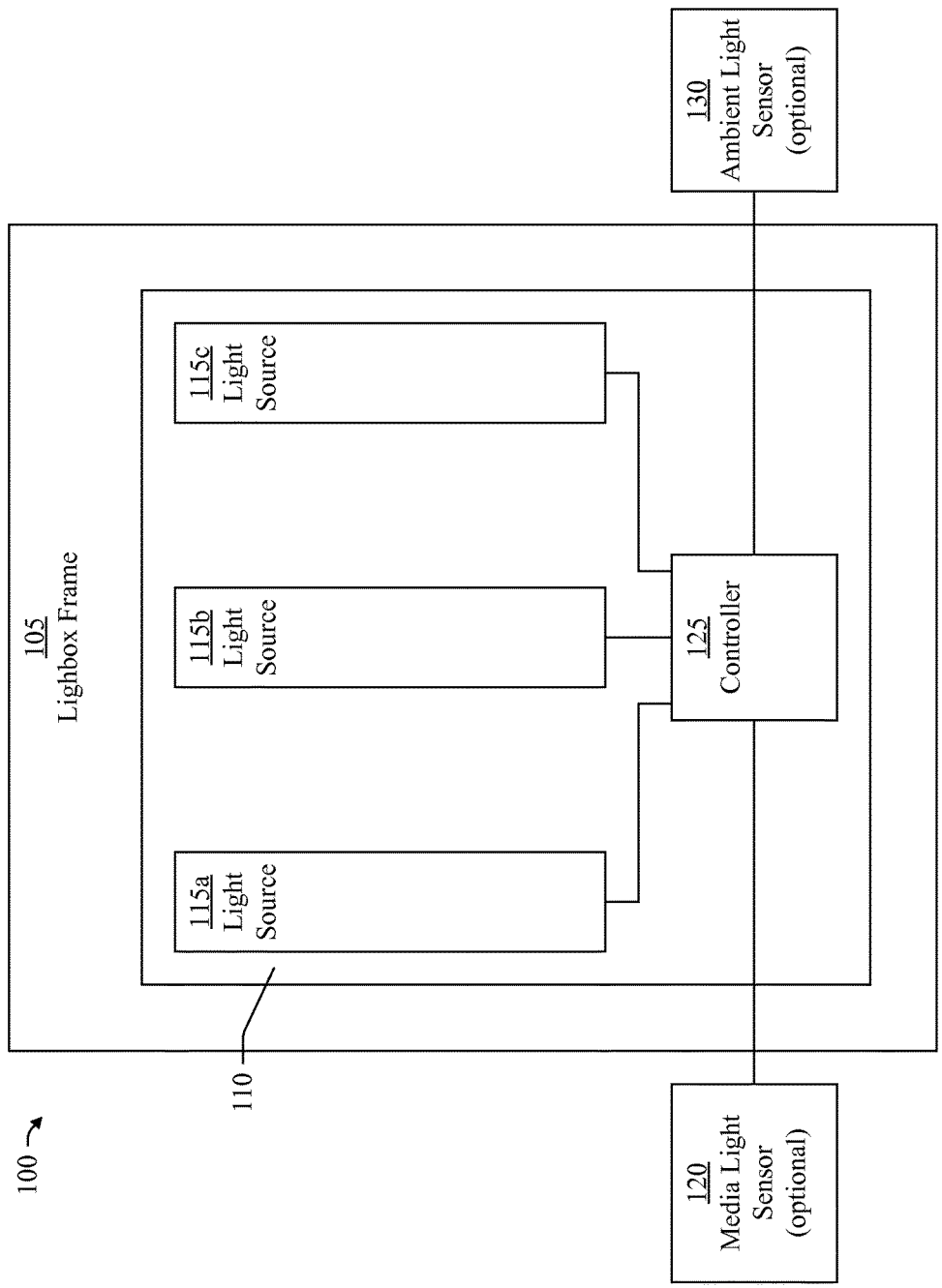
FIG. 1 is a block diagram of a tunable white light box, in accordance with an embodiment of the present invention.

FIG. 1 illustrates a tunable white light box 100, in accordance with an embodiment of the present invention. The tunable white light box 100 includes a light box frame 105 having a recess 110, a plurality of light sources 115 (e.g., light sources 115a-c), and a controller 125. The controller 125 is electrically coupled to each the light sources 115. The light box frame 105 may be any type of housing for containing the light sources 115 in the recess 110 of the light box frame 105. For example, the light sources 115 may be mounted to the light box frame 105. In some embodiments, the controller 125 is mounted to the light box frame 105, for example within the recess 110 of the light box frame 105. In other embodiments, the controller 125 is not mounted to the light box frame 105.

In various embodiments, each of the light sources 115 generates light having a peak wavelength, which is a wavelength at which the light was a highest light intensity. In some embodiments, a light source 115 generates light in a range of wavelengths including the peak wavelength. For example, the light source 115 may include a light-emitting diode (LED) that generates light predominately at a peak wavelength within a range of wavelengths. Moreover, the combination of the lights generated by the light sources 115 have a color temperature when mixed with each other.

In various embodiments, the tunable white light box 100 includes two or more light sources 115, each of which generates light at a different peak wavelength. In embodiment of the present invention illustrated in FIG. 1, the tunable white light box 100 includes three light sources 115a, 115b, and 115c, each of which has a different peak wavelength. For example, the light source 115a may generate light having a peak wavelength such that the color temperature of the generated light is 3,000 Kelvin (3,000 K), the light source 115b may generate light having a peak wavelength such that the color temperature of the generated light is 4,000 Kelvin (4,000 K), and the light source 115c may generate light having a peak wavelength such that the color temperature of the generated light is 7,000 Kelvin (7,000 K). Further in the example, the tunable white light box 100 may generate light having a color temperature in the range of 3,000 Kelvin (3,000 K) to 7,000 Kelvin K by adjusting the light intensity of each light source 115.

Color temperature is a term often used to characterize the color of light and indicates a mixture of light intensities of light wavelengths in light. Although lights may have the same color temperature, those lights may have different overall light intensities. Conversely, lights that have the same overall light intensity may have different color temperatures. Generally, light having predominant components with higher light intensities at lower wavelengths of the visible light spectrum have lower color temperatures than light having predominant components with higher light intensities at higher wavelengths of the visible light spectrum. Examples of color temperatures are provided in Table 1.

TABLE 1

Color Temperature Examples

| Color Temperature | Example |
| --- | --- |
| 2000° | Gaslight |
| 2470° | 15 watt incandescent bulb |
| 2565° | 60 watt incandescent bulb |
| 2665° | 100 watt incandescent bulb |
| 2755° | 500 watt incandescent bulb |
| 2900° | 500 watt Krypton bulb |
| 3100° | Projector type filament bulb |
| 3250° | Photo Flood |
| 3400° | Halogen |
| 3900° | Carbon arc |
| 4200° | Moonlight |
| 4700° | Industrial smog |
| 5100° | Hazy weather |
| 5500° | Sun 30° above horizon |
| 6100° | Sun 50° above horizon |
| 6700° | Electronic Flash |
| 7400° | Overcast sky |
| 8300° | Foggy weather |
| 30,000° | Blue sky |

In various embodiments, the controller 125 adjusts the light intensity of the lights generated by the light sources 115 based on an input to generate a color temperature of the combination of the lights emitted from the tunable white light box 100. For example, the input to the controller 125 may be a user input. In further embodiments, the controller 125 adjusts the overall light intensity of the combination of light emitted from the tunable white light box 100 based on the input while maintaining the color temperature of the light emitted from the tunable white light box 100.

In some embodiments, the tunable white light box 100 includes an optional media light sensor 120 for measuring a color intensity of a translucent image located adjacent to the light sources 115. For example, the translucent image may be attached to the light box frame 105 over the recess 110 in the light box frame 105. In these embodiments, the controller 125 stores a measured color temperature of the translucent image based on an input. For example, a user may provide a user input to the controller 125 for adjusting the color temperature of the translucent media and may then provide another input to the controller 125 for causing the controller 125 to store the color temperature of the translucent media measured by the media light sensor 120.

In further embodiments, the controller 125 may adjust the light intensities of the lights generated by the light sources 115 based on a color temperature measured by the media light sensor 120 and the color temperature stored in the controller 125 so that the translucent media has the same as the color temperature as the color temperature stored in the controller 125. For example, a user may provide a user input to the controller 125 for adjusting the color temperature of a first translucent media adjacent to the light sources 115 and may then provide another input to the controller 125 for causing the controller 125 to store the color temperature of the translucent media measured by the media light sensor 120. A user may then replace the first translucent media with a second translucent media that has different light diffusion characteristics than the first translucent media. A user may then provide another input to the controller 125 for causing the controller 125 to adjust the light intensities of the lights sources 115 so that the color temperature of the second translucent media measured by the media light sensor 120 is the same as the stored color temperature. In this way, the controller 125 color balances the first and second translucent media.

In still further embodiments, the media light sensor 120 may measure the overall light intensity of the first translucent image and the controller 125 may store the light intensity based on an input, such as a user input. In these embodiments, the controller 125 may adjust the light intensities of the lights generated by the light sources 115 so that the light intensity of the second translucent media is the same as the light intensity stored in the controller 125. Moreover, the controller 125 adjusts the light intensities of the lights generated by the light sources 115 to adjust the light intensity of the second translucent image while maintaining the color temperature of the second translucent image.

In some embodiments, the tunable white light box 100 includes an ambient light sensor 130 for measuring a color intensity of an ambient light external to the tunable white light box 100. For example, the ambient light may be lighting in a retail store. In these embodiments, the controller 125 adjusts the light intensities of the lights generated by the light sources 115 to adjust the light intensity of a translucent image adjacent to the light sources 115 while maintaining the color temperature of the translucent image. In some embodiments, the controller 125 may continually adjust the light intensities of the lights generated by the light sources 115 in response to changing light intensities measured by the ambient light sensor 130.

In some embodiments, the controller 125 stores the light intensity of the translucent image measured by the ambient light sensor 130 based on an input. For example, a user may provide a user input to the controller 125 for adjusting the light intensity of the translucent media and may then provide another input to the controller 125 for causing the controller 125 to store the light intensity of the translucent media measured by the media light sensor 120. The controller 125 may then adjust the light intensity of a translucent media adjacent to the light sources 115 based on a light intensity measured by the ambient light sensor 130 so that the measured light intensity is the same as the stored light intensity. Moreover, the controller 125 may adjust the light intensity while maintaining the color temperature of the translucent media.

Figure 2:
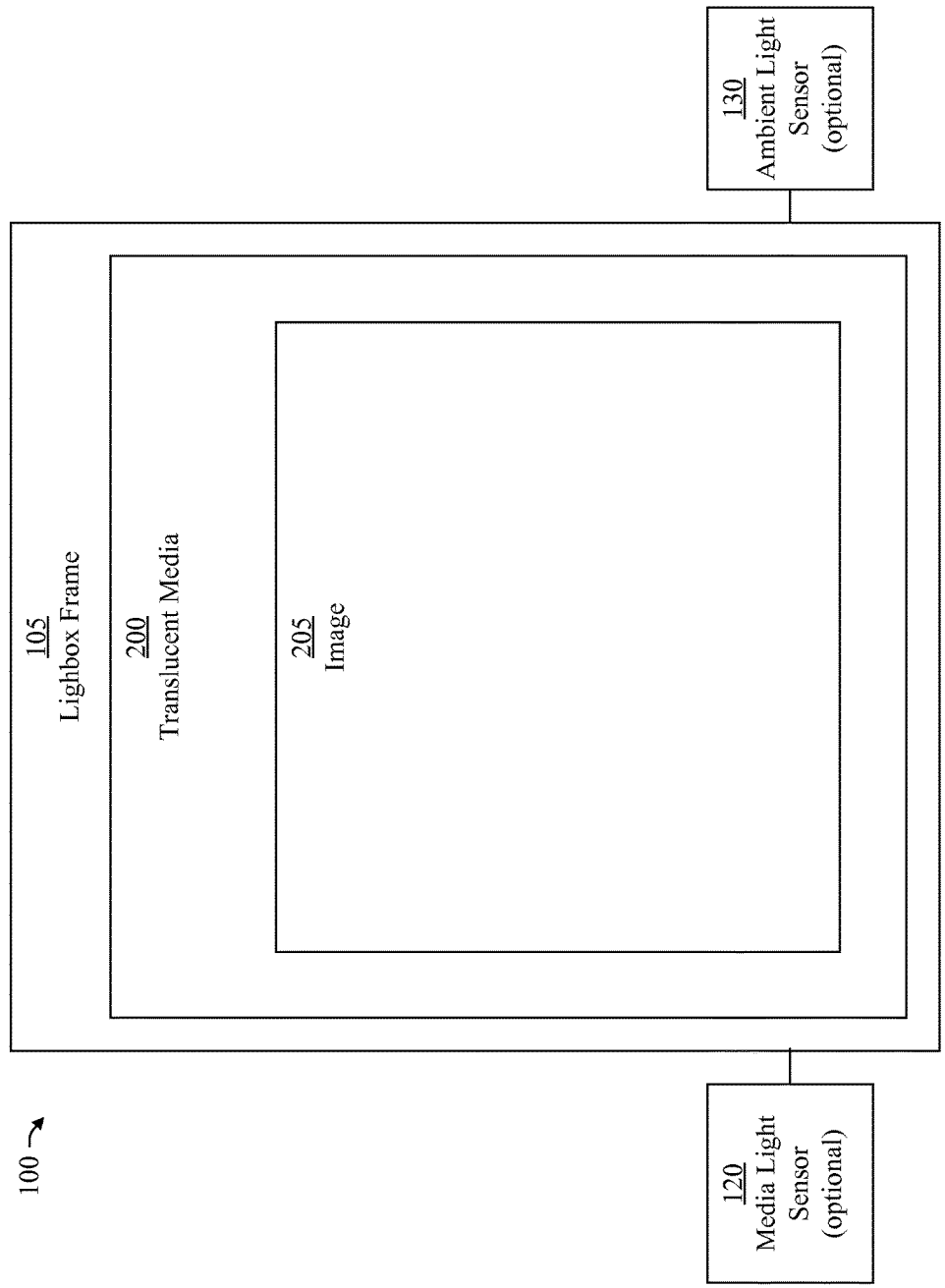
FIG. 2 illustrates a tunable white light box and a translucent media, in accordance with an embodiment of the present invention.

FIG. 2 illustrates the tunable white light box 100 and a translucent media 200, in accordance with an embodiment of the present invention. As may be envisioned from FIG. 2, the translucent media 200 is adjacent to the light sources 115 in the recess 110 of the light box frame 105. For example, the translucent media 200 may be in close proximity to the light box frame 105 so that the light generated by the light sources 115 illuminates the translucent media 200. As another example, the translucent media 200 may be attached to the light box frame 105 so that the translucent media 200 covers the recess 110 of the light box frame 105 and the light generated by the light sources 115 illuminates the translucent media. In some embodiments, the translucent media 200 includes an image 205. For example, the image 205 may include objects and text of an advertisement for a retail product.

Figure 3:
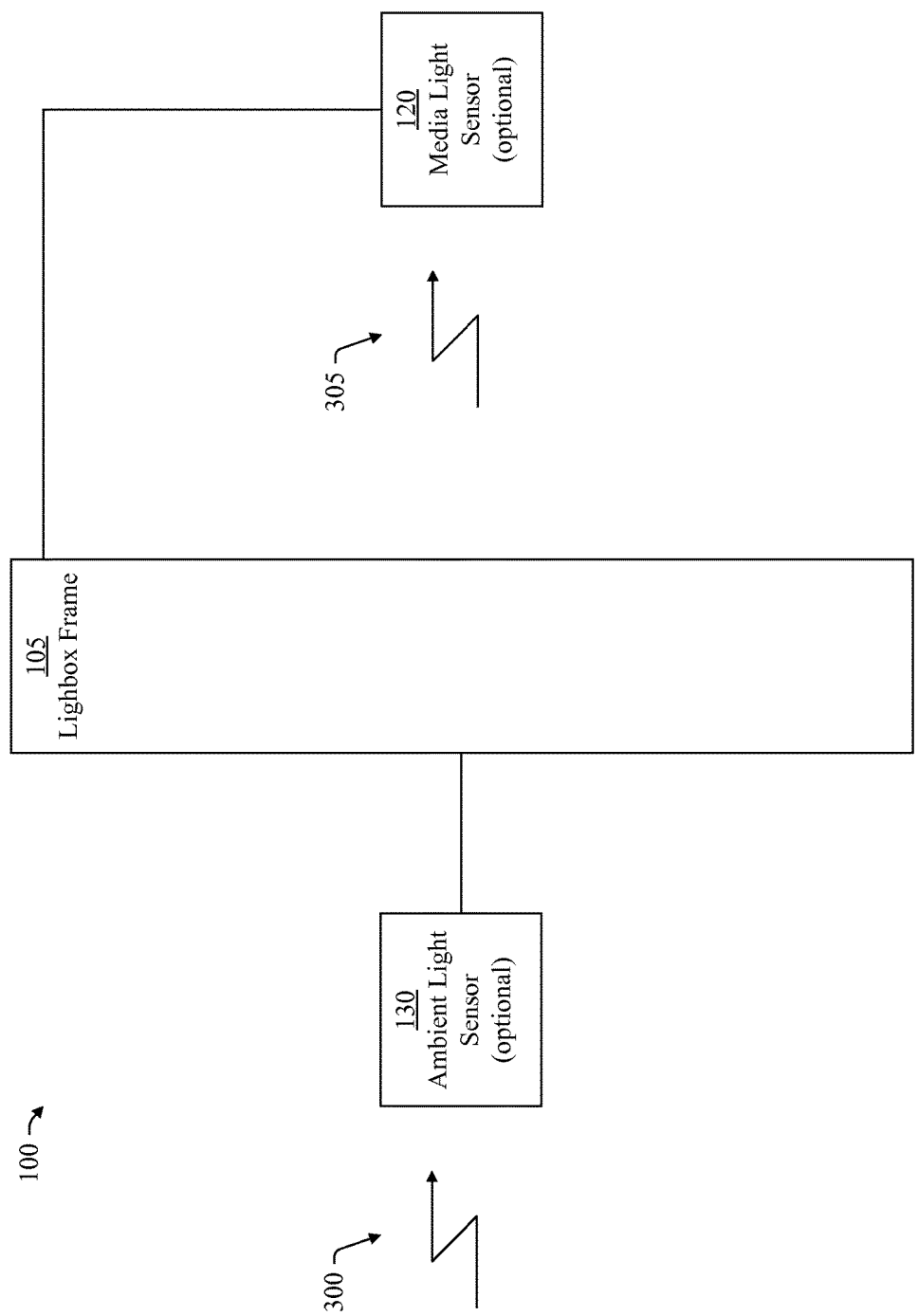
FIG. 3 illustrates a side view of the tunable white light box, in accordance with an embodiment of the present invention.

FIG. 3 illustrates a side view of the tunable white light box 100, in accordance with an embodiment of the present invention. As illustrated in FIG. 3, the tunable white light box 100 generates a light 305 and emits the light 305 from the recess 110 of the light box frame 105. The light 305 emitted from the tunable white light box 100 has a color temperature and a light intensity. Moreover, the light 305 generated by the tunable white light box 100 is considered to be an undiffused light when the light 305 is not diffused by a translucent media.

In embodiments including the ambient light sensor 130, the ambient light sensor 130 measures a color temperature of an ambient light 300. In some embodiments, the ambient light sensor 130 also measures an overall light intensity of the ambient light.

Figure 4:
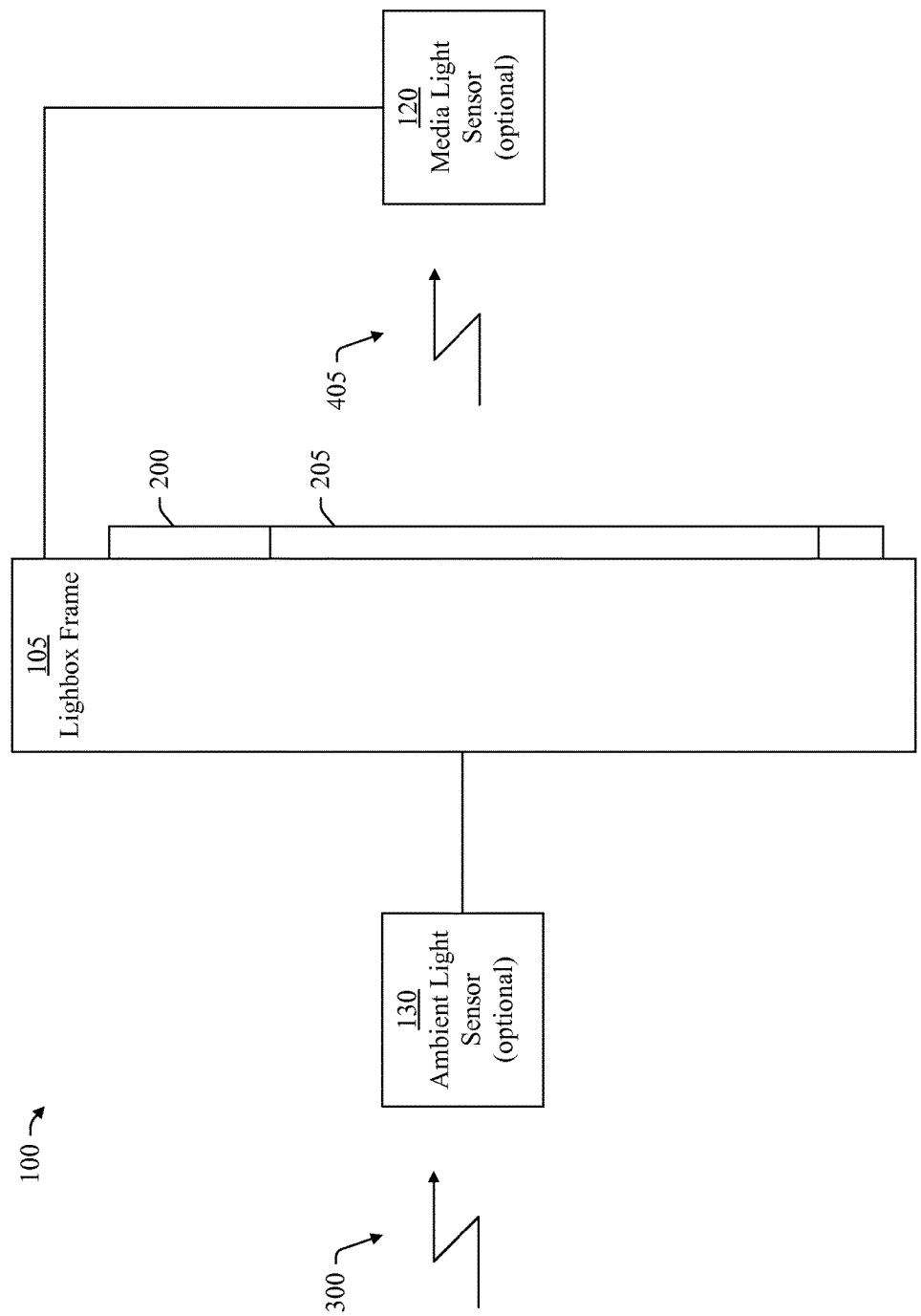
FIG. 4 illustrates a side view of a tunable white light box and a translucent media adjacent to a recess of a light box frame, in accordance with an embodiment of the present invention.

FIG. 4 illustrates a side view of the tunable white light box 100 and a translucent media adjacent to the recess 110 of the light box frame 105, in accordance with an embodiment of the present invention. As may be envisioned from FIGS. 3 and 4, the undiffused light 305 generated by the tunable white light box 100 is diffused by the translucent media 200 and becomes a diffused light 405. In this way, the light generated by the tunable white light box 100 illuminates the translucent media 200 to a color temperature and a light intensity. In embodiments including the media light sensor 120, the media light sensor 120 measures the color temperature of the translucent media 200 by measuring the color temperature of the diffused light 405. In some embodiments, the media light sensor 120 also measures an overall light intensity of the translucent media 200 by measuring the light intensity of the diffused light 405.

Figure 5:
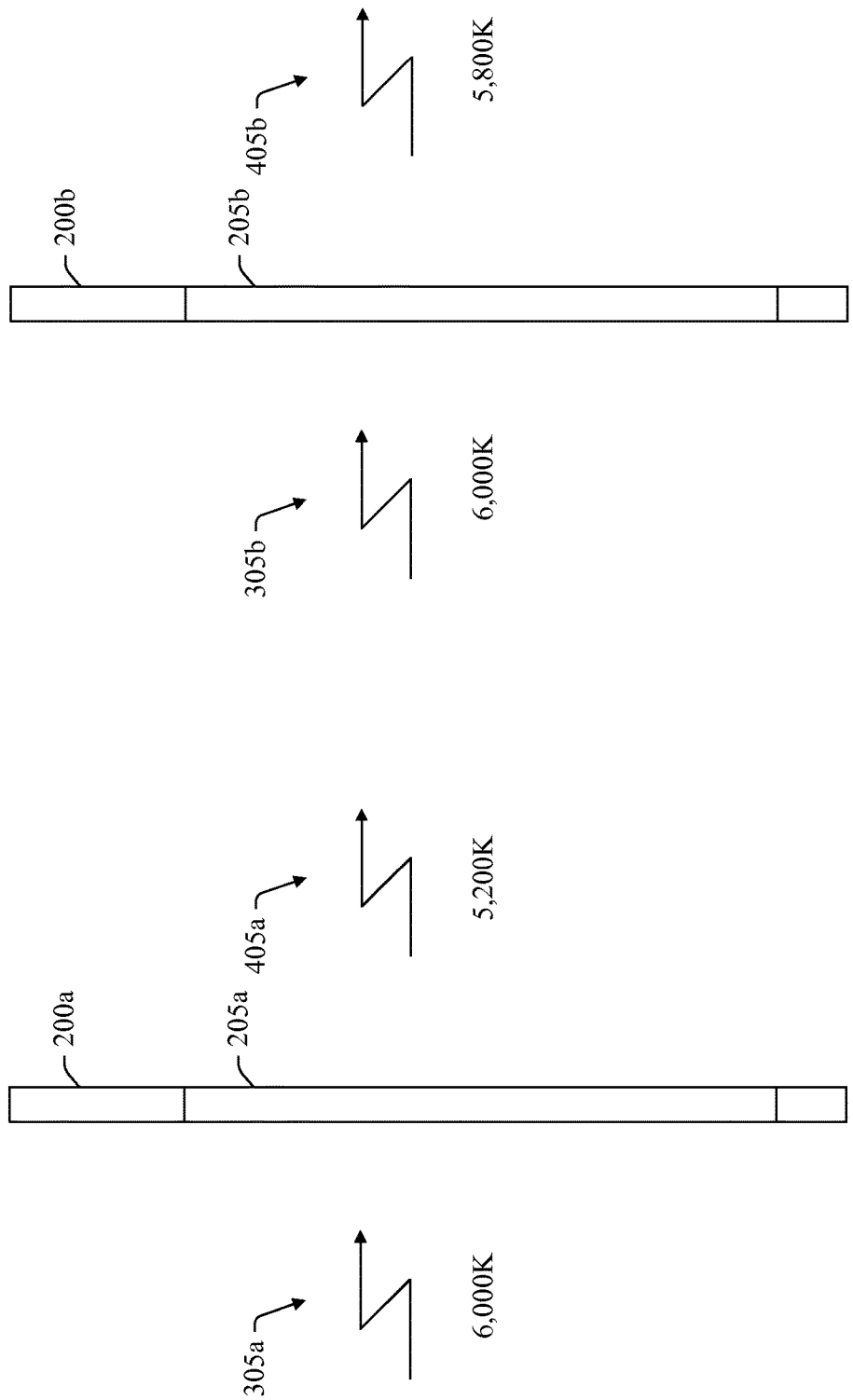
FIG. 5 illustrates operation of a tunable white light box for two translucent media and having different light diffusion characteristics, in accordance with an embodiment of the present invention.

FIG. 5 illustrates operation of the tunable white light box 100 for two translucent media 200a and 200b having different light diffusion characteristics, in accordance with an embodiment of the present invention. As may be envisioned from FIG. 5, the tunable white light box 100 generates an undiffused light 305a having a color temperature of 6,000 degrees Kelvin (6,000 K). The translucent media 200a has an image 205a and generates a diffused light 405a by diffusing the undiffused light 305a generated by the tunable white light box 100. The color temperature of the diffused light 405a has a temperature of 5,200 degrees Kelvin (5,200 K) because of the light diffusion characteristics of the translucent media 200a.

As may also be envisioned from FIG. 5, the tunable white light box 100 generates an undiffused light 305b having a color temperature of 6,000 degrees Kelvin (6,000 K). The translucent media 200b has an image 205b and generates a diffused light 405b by diffusing the undiffused light 305b generated by the tunable white light box 100. The color temperature of the diffused light 405b has a temperature of 5,800 degrees Kelvin (5,800 K) because of the light diffusion characteristics of the translucent media 200b. Thus the color temperature of the translucent media 200a is less than the color temperature of the translucent media 200b for respective undiffused lights 305a and 305b generated by the tunable white light box 100 having the same color temperature. In addition to having different color temperatures, the translucent media 200a and 200b may have different light intensities because of the different diffusion characteristics (e.g., different opacities) of the translucent media 200a and 200b.

Figure 6:
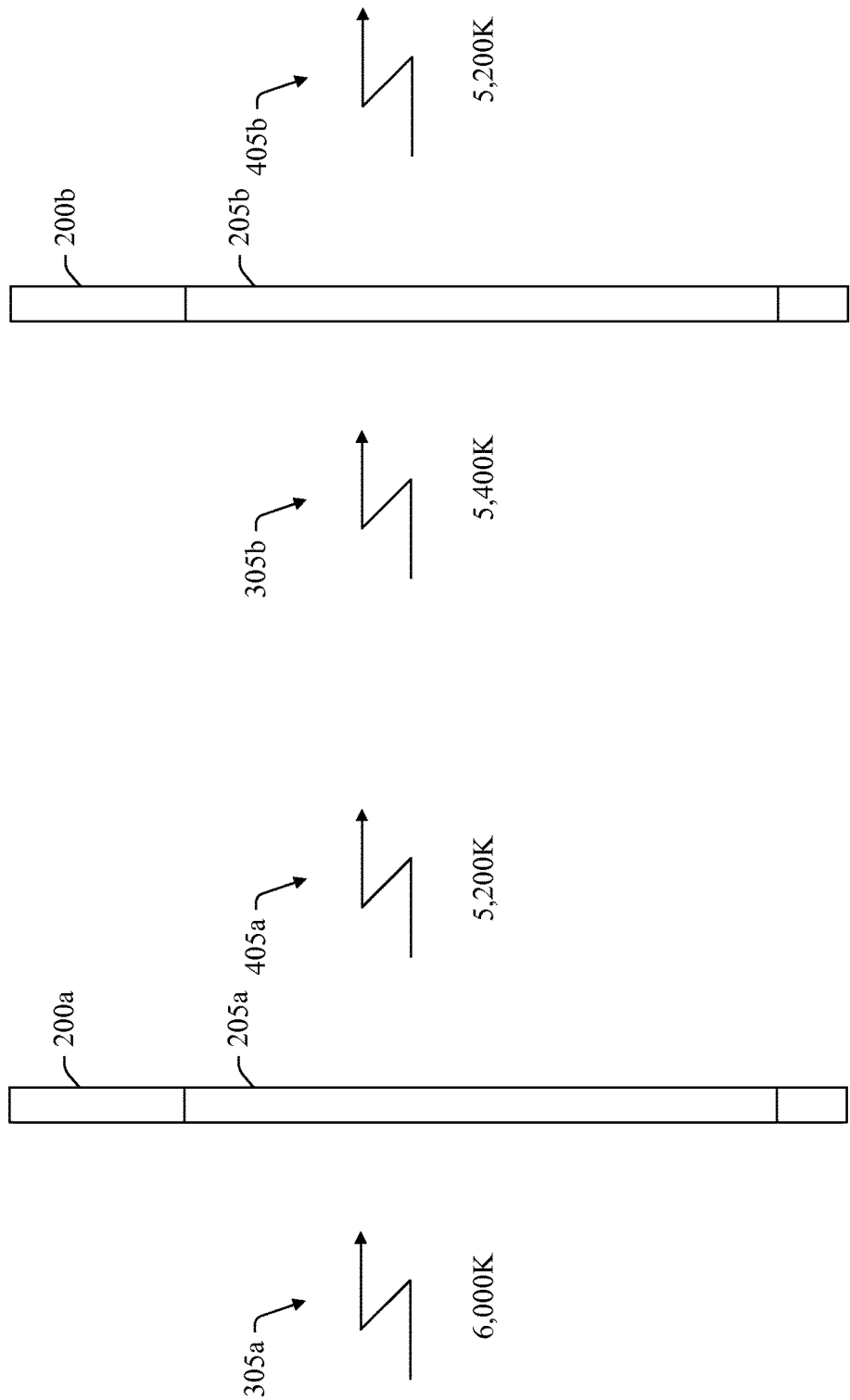
FIG. 6 illustrates operation of the tunable white light box for the two translucent media, in accordance with an embodiment of the present invention.

FIG. 6 illustrates operation of the tunable white light box 100 for the two translucent media 200a and 200b, in accordance with an embodiment of the present invention. As may be envisioned from FIG. 6, the tunable white light box 100 generates an undiffused light 305a having a color temperature of 6,000 degrees Kelvin (6,000 K). A translucent media 200a having an image 205a generates a diffused light 405a by diffusing the undiffused light 305a generated by the tunable white light box 100. The color temperature of the diffused light 405a has a temperature of 5,200 degrees Kelvin (5,200 K) because of the light diffusion characteristics of the translucent media 200a.

As may also be envisioned from FIG. 6, the tunable white light box 100 generates an undiffused light 305b having a color temperature of 5,400 degrees Kelvin (5,400 K). A translucent media 200b having an image 205b generates a diffused light 405b by diffusing the undiffused light 305b generated by the tunable white light box 100. The color temperature of the diffused light 405b has a temperature of 5,200 degrees Kelvin (5,200 K) because of the light diffusion characteristics of the translucent media 200b. Thus the color temperature of the translucent media 200a is the same as the color temperature of the translucent media 200b for respective undiffused lights 305a and 305b generated by the tunable white light box 100 having different color temperatures. In this way, the tunable white light box 100 matches the color temperatures of the two translucent media 200a and 200b by adjusting the color temperature of the lights 305a and 305b generated by tunable white light box 100. Furthermore, the tunable white light box 100 may match the light intensities of the two translucent media 200a and 200b by adjusting the overall light intensity of the light 305b generated by tunable white light box 100 while maintaining the color temperatures of the translucent media 20b.

In various embodiments, a user may provide input to the tunable white light box 100 to adjust the color temperature of a translucent media 200. For example, a user may provide input to the tunable white light box 100 to match the color temperature of a translucent media 200 with the color temperature of another translucent media 200 attached to another white tunable light box 100. As another example, a user may provide input to the tunable white light box 100 to match the color temperature of a translucent media 200 with the color temperature of a reference media. Further in the example, the reference media may include the same image 205 of the translucent media and need not be translucent. One example of the reference media is a photograph containing the image 205.

Figure 7:
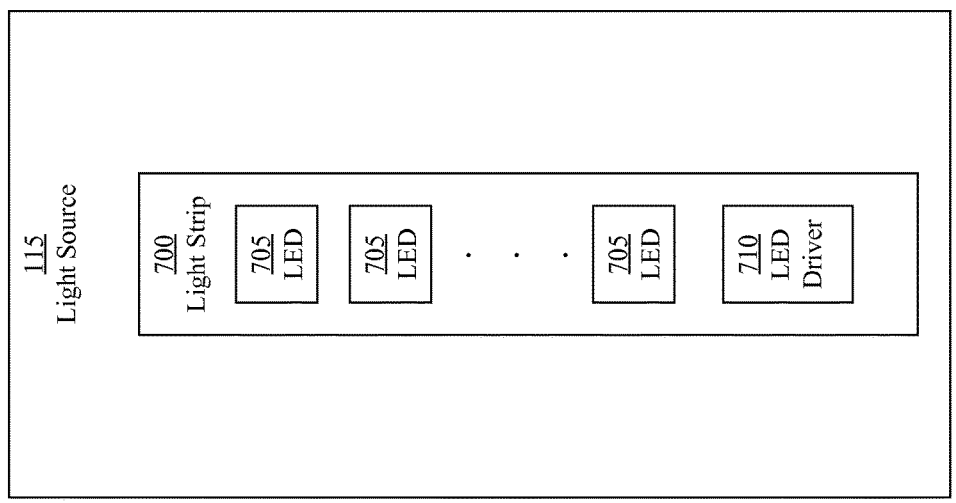
FIG. 7 illustrates a light source, in accordance with an embodiment of the present invention.

FIG. 7 illustrates the light source 115, in accordance with an embodiment of the present invention. The light source 115 includes a light strip 700, one or more light-emitting diodes (LEDs) 705, and a light-emitting diode driver (LED driver) 710. The light-emitting diode driver 710 is electrically coupled to the light-emitting diodes 705 and the controller 125. Furthermore, the light-emitting diode driver 710 is and the light-emitting diodes 705 are attached to the light strip 700. The light strip 700 is mechanically coupled to the light box frame 105. For example, the light strip 700 may be attached to the light box frame 105.

In various embodiments, the controller 125 individually controls each of the light sources 115 by individually controlling the light-emitting diode drivers 710 of the light sources 115. In some embodiments, the controller 125 individually controls the light-emitting diode drivers 710 of the light sources 115 by generating and providing a respective pulse width modulated control signal to each of the light-emitting diode drivers 710. In turn, the light-emitting diode driver 710 of each light source 115 generates a driver signal, based on the pulse width modulated signal received from the controller 125 by the light-emitting diode driver 710, for providing electrical power to the light-emitting diodes 705 of the light strip 700. In contrast to these embodiments of the light strip 700, other light box systems provide pulse width modulated signals including electrical power to a light strip for directly powering light-emitting diodes on the light strip.

An advantage of these embodiments of the light source 115 is the controller 125 generates the pulse width modulated signals for controlling the light strips 700 and the light-emitting drivers 710 generate the driver signals including the electrical power for powering the light-emitting diodes 705. In this way, each of the light strips 700 may have a respective power supply which allows the controller 125 to control a larger number of light strips 700 in contrast to other light box systems that have a single power supply and provide electrical power to light strips directly through pulse width modulated signals.

Figure 8:
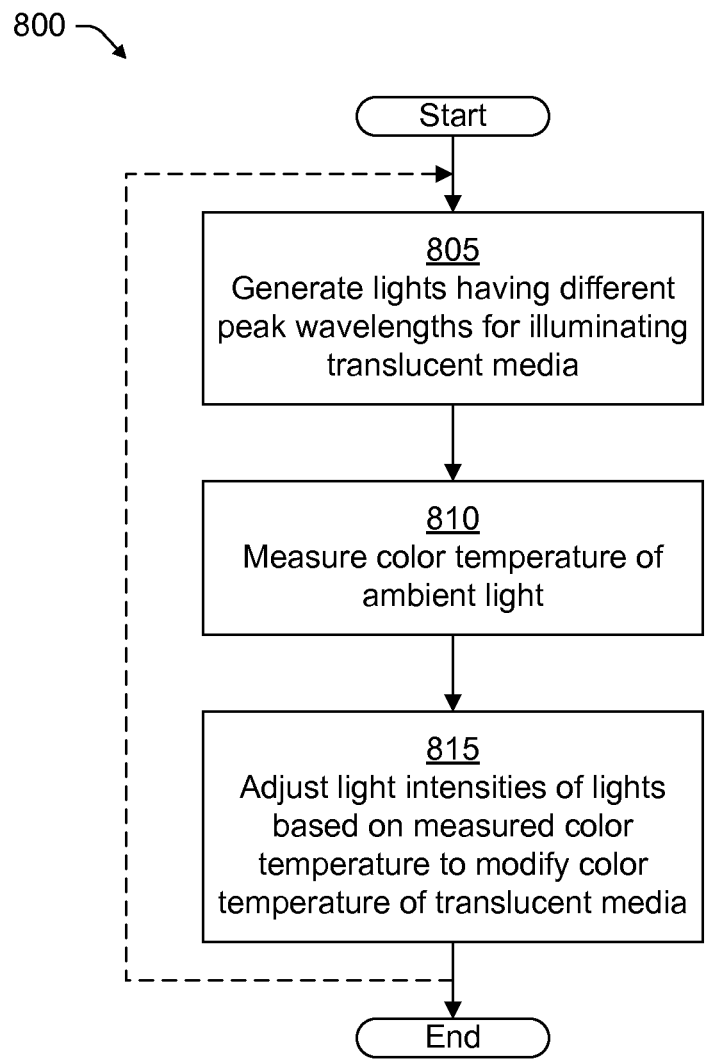
FIG. 8 illustrates a method of generating a color temperature of a translucent media, in accordance with an embodiment of the present invention.

FIG. 8 illustrates a method 800 of generating a color temperature of a translucent media, in accordance with an embodiment of the present invention. In step 805, lights having different peak wavelengths are generated for illuminating a translucent media. In various embodiments, the light sources 115 of the tunable white light box 100 generate the lights based on control signals generated by the controller 125 of the tunable white light box 100. The method 800 then proceeds to step 810.

In step 810, the color temperature of ambient light is measured. In various embodiments, the ambient light sensor 130 of the tunable white light box 100 measures the color temperature of the ambient light. In some embodiments, a user measures the color temperature of the ambient light in a subjective manner, for example by viewing the ambient light and forming an opinion of the color temperature. The method 800 then proceeds to step 815.

In step 815, the light intensities of the lights are adjusted based on the measured color temperature for generating a color temperature of the translucent media. In various embodiments, the controller 125 of the tunable white light box 100 adjusts the lights intensities of the lights generated by the tunable white light box 100 based on the measured color temperature for modifying the color temperature of a translucent media 200. The method 800 then ends. In alternative embodiments, the method 800 returns to step 805 one or more times after step 815 before the method 800 ends.

In various embodiments, the method 800 may have more or fewer steps that the steps 805-815 described above and illustrated in FIG. 8. In some embodiments, one or more of the steps 805-815 may be performed in parallel with each other. In some embodiments, the steps 805-815 may be performed in a different order than that described above and illustrated in FIG. 8. In some embodiments, one or more of steps 805-815 may be performed more than once in the method 800.

Figure 9:
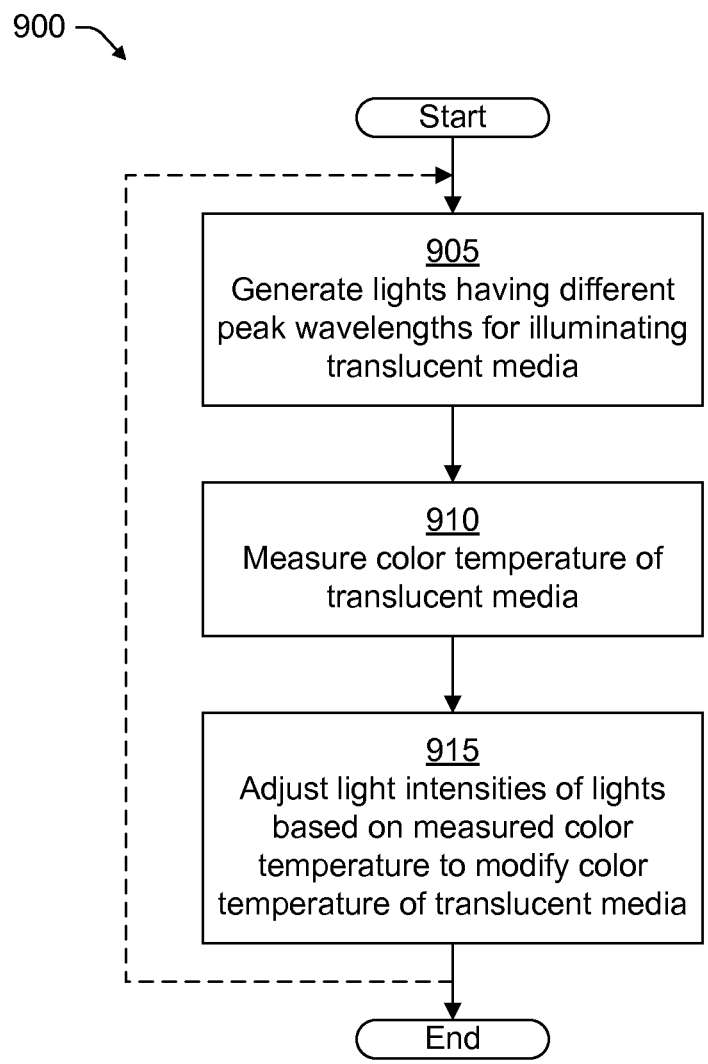
FIG. 9 illustrates a method of generating a color temperature of a translucent media, in accordance with an embodiment of the present invention.

FIG. 9 illustrates a method 900 of generating a color temperature of a translucent media, in accordance with an embodiment of the present invention. In step 905, lights having different peak wavelengths are generated for illuminating a translucent media. In various embodiments, the light sources 115 of the tunable white light box 100 generate the lights based on control signals generated by the controller 125 of the tunable white light box 100. The method 900 then proceeds to step 910.

In step 910, a color temperature of the translucent media is measured. In various embodiments, the media light sensor 120 of the tunable white light box 100 measures the color temperature of a translucent media 200. In some embodiments, a user measures the color temperature of the ambient light in a subjective manner, for example by viewing the translucent media 200 and forming an opinion of the color temperature. The method 900 then proceeds to step 915.

In step 915, the light intensities of the lights are adjusted based on the measured color temperature for modifying the color temperature of the translucent media. In various embodiments, the controller 125 of the tunable white light box 100 adjusts the lights intensities of the lights generated by the tunable white light box 100 based on the measured color temperature for modifying the color temperature of a translucent media 200. The method 900 then ends. In alternative embodiments, the method 900 returns to step 905 one or more times after step 915 before the method 900 ends.

In various embodiments, the method 900 may have more or fewer steps that the steps 905-915 described above and illustrated in FIG. 9. In some embodiments, one or more of the steps 905-915 may be performed in parallel with each other. In some embodiments, the steps 905-915 may be performed in a different order than that described above and illustrated in FIG. 9. In some embodiments, one or more of steps 905-915 may be performed more than once in the method 900.

Figure 10:
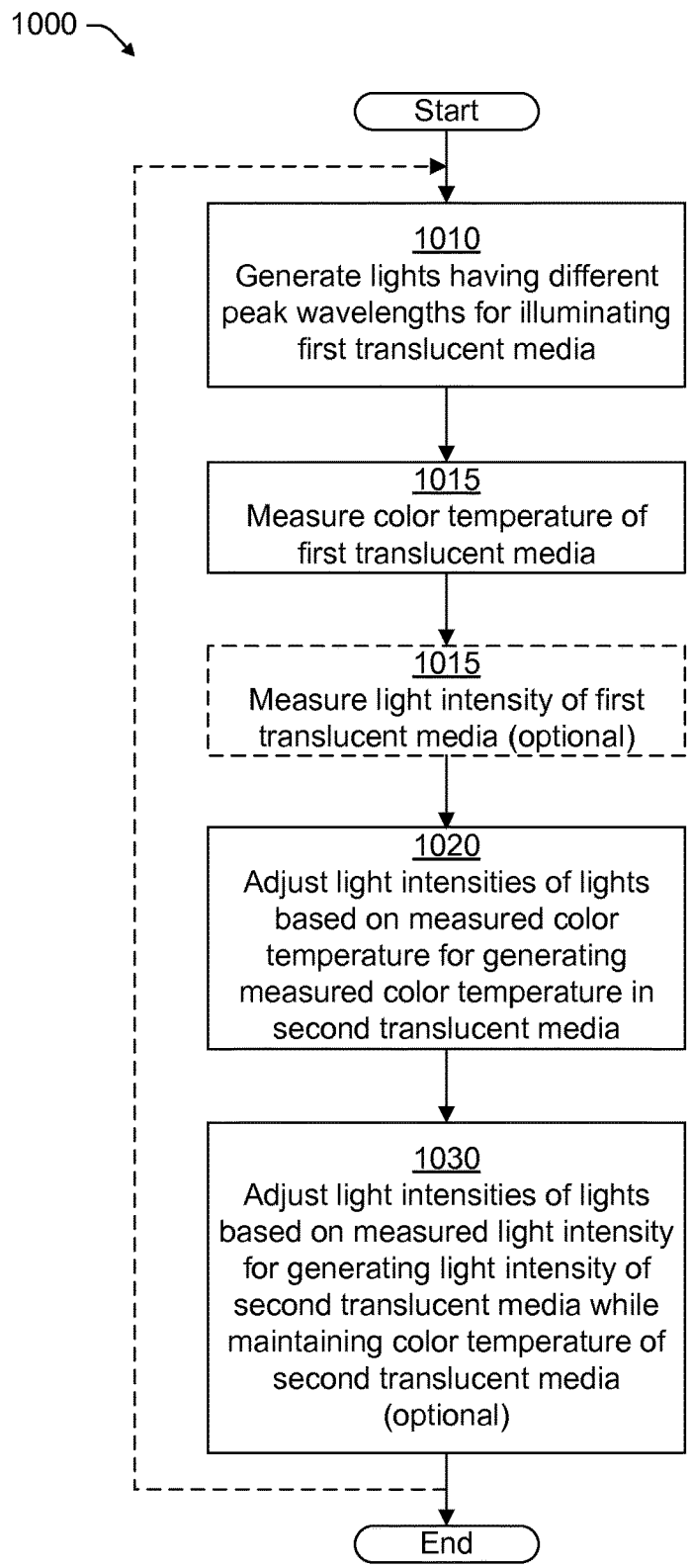
FIG. 10 illustrates a method of generating a color temperature of a translucent media, in accordance with an embodiment of the present invention.

FIG. 10 illustrates a method 1000 of generating a color temperature of a translucent media, in accordance with an embodiment of the present invention. In step 1005, lights having different peak wavelengths are generated for illuminating a translucent media. In various embodiments, the light sources 115 of the tunable white light box 100 generate the lights based on control signals generated by the controller 125 of the tunable white light box 100. The method 1000 then proceeds to step 1010.

In step 1010, a color temperature of a first translucent media is measured. In various embodiments, the media light sensor 120 of the tunable white light box 100 measures the color temperature of a first translucent media 200. In some embodiments, a user measures the color temperature of the first translucent media 200 in a subjective manner, for example by viewing the ambient light and forming an opinion of the color temperature. The method 1000 then proceeds to optional step 1015.

In optional step 1015, a light intensity of the first translucent media is measured. In various embodiments, the media light sensor 120 of the tunable white light box 100 measures the light intensity of the first translucent media 200. In some embodiments, a user measures the light intensity of the first translucent media 200 in a subjective manner, for example by viewing the translucent media 200 and forming an opinion of the light intensity. The method 1000 then proceeds to step 1020.

In step 1020, the light intensities of the lights are adjusted based on the measured color temperature for generating the measured color temperature in a second translucent media. In various embodiments, the controller 125 of the tunable white light box 100 adjusts the light intensities of the lights generated by the tunable white light box 100 based on the measured color temperature for generating the color temperature of the second translucent media 200. In some embodiments, the controller 125 adjusts the light intensities of the lights based on user input. The method 1000 then proceeds to optional step 1025.

In optional step 1025, the light intensities of the lights are adjusted based on the measured light intensity for generating the measured light intensity in the second translucent media while maintaining the color temperature of the second translucent media. In various embodiments, the controller 125 of the tunable white light box 100 adjusts the lights intensities of the lights generated by the tunable white light box 100 based on the measured light intensity for generating the light intensity of the second translucent media 200. In some embodiments, the controller 125 adjusts the light intensities of the lights based on user input. The method 1000 then ends. In alternative embodiments, the method 1000 returns to step 1005 one or more times after step 1025 before the method 1000 ends.

In various embodiments, the method 1000 may have more or fewer steps that the steps 1005-1025 described above and illustrated in FIG. 10. In some embodiments, one or more of the steps 1005-1025 may be performed in parallel with each other. In some embodiments, the steps 1005-1025 may be performed in a different order than that described above and illustrated in FIG. 10. In some embodiments, one or more of steps 1005-1025 may be performed more than once in the method 1000.

Although the invention has been described with reference to particular embodiments thereof, it will be apparent to one of ordinary skill in the art that modifications to the described embodiment may be made without departing from the spirit of the invention. Accordingly, the scope of the invention will be defined by the attached claims not by the above detailed description.

What is claimed is:

1. A tunable white light box comprising:
    a light box frame having a recess;
    a translucent media attached to the light box frame over the recess and comprising a printed image;
    a plurality of light-emitting diode light sources contained in the recess of the light box frame and configured to illuminate and be diffused through the translucent media having the printed image, each light-emitting diode light source configured to generate a corresponding light having a peak wavelength, wherein a peak wavelength of light generated by a first light-emitting diode light source of the plurality of light-emitting diode light sources is different from a peak wavelength of light generated by a second light-emitting diode light source of the plurality of light-emitting diode light sources and a peak wavelength of light generated by a third light-emitting diode light source of the plurality of light-emitting diode light sources is different from the peak wavelengths of the first and second light-emitting diode light sources;
    a media light sensor located outside the light box frame and configured to measure a color temperature of the diffused light that exits through the translucent media; and
    a controller operable to individually adjust a light intensity of each of the three light-emitting diode light sources of the plurality of light-emitting diode light sources until the color temperature measured by the media light sensor matches a color temperature of a reference media, wherein the color temperature of the reference media is a color temperature of light reflecting off of an image printed on non-translucent media that is the same image as the image printed on the translucent media.

2. The tunable white light box of claim 1, wherein when the controller adjusts the light intensity of each light-emitting diode light source of the plurality of light-emitting diode light sources a color temperature of the light being emitted through the translucent media having the printed image is adjusted or is maintained.

3. The tunable white light box of claim 1, wherein each light-emitting diode light source of the plurality of light-emitting diode light sources comprises a light strip including a light-emitting diode driver, and wherein the controller is further configured to generate a respective pulse-width modulated signal for each light-emitting diode driver for controlling the light intensity of each light-emitting diode light source.

4. A tunable white light box comprising:
    a first light box frame having a recess;
    a first translucent media affixed to the first light box frame over the recess and comprising a printed image;
    a plurality of light-emitting diode light sources contained in the recess of the first light box frame and configured to illuminate and be diffused through the first translucent media having the printed image, each light-emitting diode light source configured to generate a corresponding light having a peak wavelength, wherein a peak wavelength of light generated by a first light-emitting diode light source of the plurality of light-emitting diode light sources is different from a peak wavelength of light generated by a second light-emitting diode light source of the plurality of light-emitting diode light sources and a peak wavelength of light generated by a third light-emitting diode light source of the plurality of light-emitting diode light sources is different from the peak wavelengths of the first and second light-emitting diode light sources;
    a media light sensor located outside the first light box frame and configured to measure a color temperature of the diffused light that exits through the first translucent media; and
    a controller operable to individually adjust a light intensity of each of the three light-emitting diode light sources of the plurality of light-emitting diode light sources within the first light box frame until the color temperature measured by the media light sensor matches a color temperature of light being emitted through a second translucent media having a printed image that is the same image as the image printed on the first translucent media and the second translucent media is affixed to a second light box frame that is different from the first light box frame and the second light box frame contains at least one light emitting diode light source that is configured to illuminate and be diffused through the second translucent media having the printed image; and
    wherein the printed image on the first translucent media is manufactured with a different printing process than the printed image on the second translucent media.

5. The tunable white light box of claim 4, wherein the controller is further operable to adjust the light intensity of each light-emitting diode light source of the plurality of light-emitting diode light sources while maintaining the color temperature of light emitted through the first translucent media.

6. The tunable white light box of claim 4, wherein each light emitting diode light source of the plurality of light-emitting diode light sources comprises a light strip including a light-emitting diode driver, and wherein the controller is further configured to generate a respective pulse-width modulated signal for each light-emitting diode driver for controlling the light intensity of each light-emitting diode light source.

7. The tunable white light box of claim 4, further comprising:
    an ambient light sensor located outside of the first light box frame configured to measure a color temperature of an ambient light, wherein the controller is configured to adjust the light intensity of the light generated from each light-emitting diode light source of the plurality of light-emitting diode light sources based on the measured color temperature of the ambient light.

8. The tunable white light box of claim 7, wherein the ambient light sensor is further configured to measure a light intensity of the ambient light, and wherein the controller is further configured to adjust the light intensity of each light-emitting diode light source of the plurality of light-emitting diode light sources based on the measured light intensity of the ambient light.

9. The tunable white light box of claim 8, wherein the controller is further configured to adjust the light intensity of each light-emitting diode light source of the plurality of light-emitting diode light sources while maintaining the color temperature of the light emitting through the first translucent media having the printed image.

10. The tunable white light box of claim 8, wherein the controller is further configured to adjust the light intensity of each light-emitting diode light source of the plurality of light-emitting diode light sources so that the light intensity of the light emitting through the first translucent media having the printed image is the same as the measured light intensity of the ambient light.

11. The tunable white light box of claim 10, wherein the controller is further configured to adjust the light intensity of the light emitting through the first translucent media having the printed image while maintaining the color temperature of the light emitting through the first translucent media having the printed image.

12. The tunable white light box of claim 8, wherein the controller is further configured to adjust the light intensity of each light-emitting diode light source of the plurality of light-emitting diode light sources, based on the measured color temperature of the ambient light and the measured color temperature of light emitting through the first translucent media having the printed image.

13. A method of illuminating an image printed on translucent media, the method comprising:
generating light from a corresponding plurality of light-emitting diode light sources located inside a light box frame having a recess for illuminating the image printed on the translucent media that is attached to the light box frame, each of the plurality of light-emitting diode light sources having a peak wavelength, wherein a peak wavelength of light generated by a first light-emitting diode light source of the plurality of light-emitting diode light sources is different from a peak wavelength of light generated by a second light-emitting diode light source of the plurality of light-emitting diode light sources and a peak wavelength of light generated by a third light-emitting diode light source of the plurality of light-emitting diode light sources is different from the peak wavelengths of the first and second light-emitting diode light sources;
measuring a color temperature of the light being illuminated through the image printed on the translucent media with a media light sensor located outside the light box frame;
comparing the measured color temperature of the light being illuminated through the image printed on the translucent media with a color temperature of a reference media, wherein the color temperature of the reference media is a color temperature of light reflecting off of an image printed on non-translucent media that is the same image as the image printed on the translucent media; and
individually adjusting a light intensity of the light generated from each light-emitting diode light source of the plurality of light-emitting diode light sources to match the color temperature of the reference media with the color temperature measured by the media light sensor.

14. The method of claim 13, further comprising:
measuring a light intensity of an ambient light with an ambient light sensor located outside the light box frame; and
adjusting the light intensity of each light-emitting diode light source of the plurality of light-emitting diode light sources based on the measured ambient light.

15. The method of claim 13, wherein each light-emitting diode light source of the plurality of light-emitting diode light sources comprises a light strip including a light-emitting diode driver, the method further comprising:
generating an individual pulse-width modulated signal for the light strip in each light-emitting diode light source of the plurality of light-emitting diode light sources for controlling the light intensity of the light-emitting diode light source.

16. The method claim 13, further comprising:
storing the color temperature measured by the media light sensor before adjusting a light intensity of the light generated from each light-emitting diode light source of the plurality of light-emitting diode light sources to match the color temperature measured by the media light sensor with the color temperature of the reference media.

* * * * *